United States Patent
Parks

[11] Patent Number: 5,664,818
[45] Date of Patent: Sep. 9, 1997

[54] DISH TRANSPORT APPARATUS WITH BOTH FIXED AND MOVABLE HANDLES

[76] Inventor: Charles Sherman Parks, P.O. Box 127, Greenwood, Del. 19950

[21] Appl. No.: 689,438

[22] Filed: Aug. 12, 1996

[51] Int. Cl.⁶ ................................................ A47J 45/10
[52] U.S. Cl. ......................... 294/32; 294/141; 294/169
[58] Field of Search ........................ 294/27.1, 28, 32, 294/137, 141, 142, 144, 167, 169, 172

[56] References Cited

U.S. PATENT DOCUMENTS

| | | | |
|---|---|---|---|
| D. 231,765 | 6/1974 | Kean | 294/169 |
| 276,510 | 4/1883 | Vreeland | 294/169 |
| 946,977 | 1/1910 | Muller | 294/142 |
| 2,964,199 | 12/1960 | Portner | 294/142 |
| 3,934,772 | 1/1976 | Brannan | 294/27.1 |
| 5,354,111 | 10/1994 | Parks | 294/169 |

FOREIGN PATENT DOCUMENTS

| | | | |
|---|---|---|---|
| 929130 | 12/1947 | France | 294/169 |
| 721629 | 7/1942 | Germany | 294/144 |

*Primary Examiner*—Dean Kramer

[57] ABSTRACT

The invention provides a carrier for hot baking dishes and the like having two movable handles (16) and two fixed handles (12b). With the fixed handles (12b) the apparatus can be lifted and moves using two hands. The movable handles (16) are pivotally connected to the base members (10) thus allowing them to be moved to an upright, carrying position and a lowered, loading position. With movable handles (16) in the carrying position the apparatus can be carried using only one hand. In the lowered position the movable handles (16) are positioned to provide finger access to both the flanges of a dish sitting on the carrier and to the fixed handles of the carrier. Therefore, with movable handles (16) in the down position, dishes can be loaded onto and off of the apparatus. Also, food can be added to or removed from the dish thereon.

10 Claims, 2 Drawing Sheets

DISH TRANSPORT APPARATUS WITH BOTH FIXED AND MOVABLE HANDLES

BACKGROUND—FIELD OF THE INVENTION

The present invention relates to devices for the manual transport of baking dishes and other such items and more particularly to transport devices which may serve also to protect a surface upon which a hot baking dish may be placed from the heat thereof.

PRIOR ART

There is considerable hazard involved in the handling and carrying of baking dishes taken hot from the oven. In addition, carrying such dishes-to a distant location (e.g. to a picnic area or covered dish social) requires the use of both-hands and is very inconvenient as well as hazardous. Moreover, the table or other surface upon which the hot dish is placed, whether close by or distant, must be protected from the heat of the dish.

The carrier of my invention reduces the hazards for the handler of a hot baking dish and protects the table from being damaged by the heat of the dish.

My invention provides a carrying device with movable handles with which a baking dish may be safely and conveniently carried with the use of only one hand. This is particularly useful when one desires to carry a dish for a long distance as for example to a picnic area in the park. In addition to the movable handles my dish transport apparatus has two fixed handles whereby it can be lifted and moved with two hands. This is convenient for moving a hot baking dish short distances, as for example to reposition it from one end of the table to the other.

My dish carrier has support members upon which the hot baking dish rests. These support members keep the hot dish suspended a sufficient distance above the surface upon which the carrier rest to protect that surface from damage caused by the heat of the dish.

There are devices for carrying plates, dishes and such (e.g. U.S. Pat. No. 3,628,708 to Daughrty; U.S. Pat. No. 2,078,650 to Clark; and my previous invention: U.S. Pat. No. 5,354,111 to Parks). However, these do not have both a pair of fixed handles for two hand manipulation and movable handles for one hand carrying.

My previous invention, cited above, utilizes movable, duel positionable handles. However, the angled pivot slots in the arms of that apparatus make it confusing and cumbersome for some users to reposition the handle from the loading position to the carrying position. Also it is a common practice for cooks to cover baking dishes containing prepared food with aluminum foil. The high sides (base members) of U.S. Pat. No. 5,345,111 render it nearly impossible to cover a dish with aluminum foil after it is placed in the carrier. If the dish is covered with foil before being placed in the carrier, the foil is pushed off as the dish is lowered into the carrier. Moreover, the angled slots in the arms, and the channels in the base portions of U.S. Pat. No. 5,345,111 require added, time consuming steps in the manufacturing process, thus substantially increasing production cost.

No device is known in the prior art with construction similar to that of my present invention which utilizes both fixed handles and movable handles, and which is suitable for carrying a hot baking dish with one hand and for holding the hot dish on the table while protecting the table from the heat thereof.

SUMMARY OF THE INVENTION

The present invention is a carrier for hot baking dishes comprising two upstanding base members connected in parallel fashion by front and rear cross members, one or more support members connected near the bottom of the base or cross members, a pair of fixed handles in conjunction with or in addition to the cross members, and a pair of movable handles pivotally connected to base members.

The pivot connection allows the movable handles to be moved upward to a carrying position and downward to a loading position. In the downward position the gripping portion of the movable handles are caused to be positioned generally level with and generally parallel to the fixed handles allowing space above the movable handle grippingportions for the user's fingers to access the lifting flange of a baking dish nested in the carrier and space below to access the fixed handle of the carrier.

The support member(s) support the weight of the dish and prevent the hot dish from touching and damaging the surface on which it is placed.

OBJECTS AND ADVANTAGES

It is an object of the present invention to provide a carrying apparatus for hot baking dishes which:
 (a) is simpler in design, will require fewer steps to manufacture, and will be cheaper to produce
 (b) has movable handles simpler in design and easier to move from the loading position to the carrying position
 (c) will readily allow for the dish placed therein to be covered with aluminum foil or other material
 (d) will be suitable for use as a holder for a dish on the dinning table
 (e) will protect the surface of the countertop or table from the heat of a baking dish taken from the oven and placed therein.
 (f) may readily and more safely be lifted (using two hands gripping two fixed handles) and moved short distances, as for example from one end of a table to the center of the table
 (g) may be more safely and conveniently carried using only one hand gripping the movable handles. This frees the user's other hand to open doors or carry other items and is particularly desirable when the dish is to be carried for some distance as for example from the kitchen to a picnic area in the park
 (h) has movable handles which can be positioned upward for carrying and moved to a downward position where they will be out of the way for loading and unloading dishes into and out of the carrier and for removing food from a dish nested in the carrier on the table
 (i) has movable handles which when in the downward, loading position will be situated so as to allow free access for the user's fingers to grip both the lifting flange of a baking dish nested in the carrier and the fixed handles of the carrier.

Other objects will become known to those skilled in the art once the invention is shown and described.

BRIEF DESCRIPTION OF THE DRAWINGS

FIG. 1-B shows the attachment of the cross member to the base member in the preferred embodiment.

FIG. 1-C shows the preferred embodiment of my present invention-with movable handles downward in loading position and a baking dish nested therein.

FIG. 1-D shows a cross sectional side views of the movable handle in the loading position of the preferred embodiment.

FIG. 2-B Shows a cross sectional side view of fixed handle, cross member, and support member in relation to the base member in the alternate embodiment of FIG. 2-A.

FIG. 2-C shows a cross sectional side view of the movable handle in the down position for the alternate embodiment of FIG. 2-A.

FIG. 3-B shows yet another alternate/embodiment of the invention with movable handle in down position.

FIG. 4-B shows an additional cross sectional side view of an alternate embodiment of the handle rests with movable handles in down position.

DETAILED DESCRIPTION OF DRAWINGS

Figure 1A:
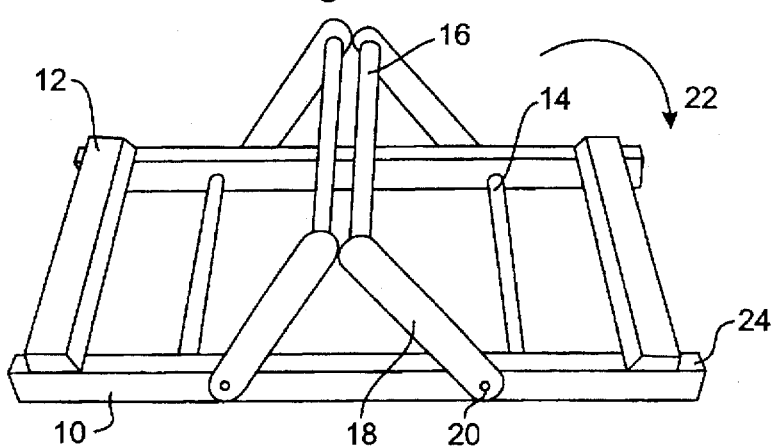
FIG. 1-A shows the preferred embodiment of the carrier of my present invention with movable handles upward for carrying.
Figure 1B:
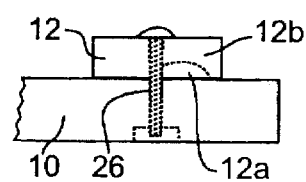
Figure 1C:
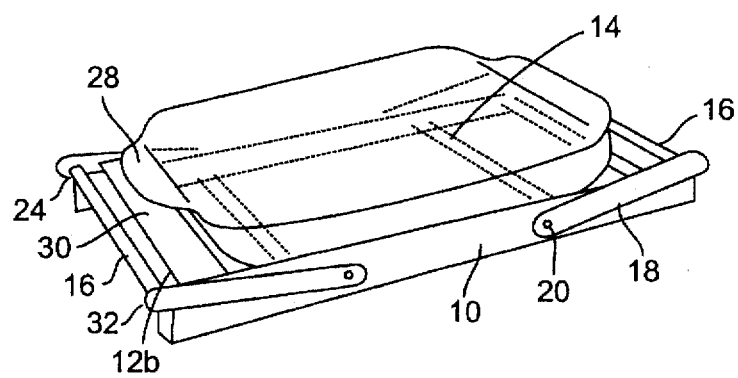
Figure 1D:
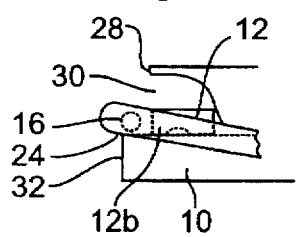

FIG. 1-A shows the preferred embodiment of the invention with the movable handles in the upright, carrying position. The base is comprised of left and right upstanding, rigid base members 10. Cross members 12 connect base members 10 to one another in parallel fashion. This forms a square or rectangle having an interior space selectively sized to nestly hold a baking dish. At least one support member 14 extends longitudinally from inside face to inside face of base members 10. It is preferred that two support members 14 be used. Support members 14 are connected near the bottom edges of base members 10 and about one fourth of the way in from the ends of base members 10. It is preferred that support members 14 be longitudinal, cylindrical members mated to holes bored in base members 10 to secure the connection thereto. Other shapes and methods known in the art may also be used. A pair of movable handle comprised of gripping portions 16 and a pair of handle shafts or arms 18 are pivotally connected one at each end of base members 10 to the outside face of base members 10 with screws, rivets or pins 20 through single, round holes in each arm 18. The holes in arms 18 are near the ends of the arms opposite the ends which are connected to movable handle gripping portions 16. Handle gripping portions 16 may be moved to a lowered position where they rest on handle rests 24 which are the portions of base members 10 which extend beyond cross member 12. See arrow 22.

FIG. 1-B is a cross sectional view of the attachment of cross member 12 to base member 10. A finger-grip groove 12a is provided in the under side of cross member 12 thus defining the outward facing portion of cross member 12 as a fixed handle 12b. Screw, nail, pin, rivet or bolt 26 may be used to attach cross member 12 to base member 10. For strength and safety it is preferred that the attachment of cross member 12 to base member 10 be made with rivet or bolt 26 extending through the bodies of both cross member 12 and base member 10.

In FIG. 1-C the preferred embodiment of the invention is shown with movable handle gripping portions 16 in the lowered, loading position. Movable handle gripping portions 16 rest on handle rests 24. Resting on handle rests 24 gripping portions 16 are held generally parallel to and generally in the same plane as fixed handles 12b. Finger access to dish lifting flange 28 is provided through access space 30. Finger access to fixed handle 12b is provided through access space 32. See FIG. 1-D for a cross sectional view of this arrangement.

When the baking dish is nestly seated in the carrier, the bottom of the dish rests on support members 14. Support members 14 prevent a hot dish from making contact with and damaging the surface upon which the carrier sits. Base members 10 and cross members 12 prevent the dish from sliding off base members 14.

With movable handle gripping portions 16 in the loading position baking dishes can be freely placed in and removed from the carrier; food can be taken from and/or added to the dish in the carrier; and the carrier can be lifted and moved using the pair of fixed handles 12b. Simply by lifting movable handles 16 upward to the carrying position, the carrier and dish can easily be carried with one hand, freeing the other hand to open doors or carry other items.

Figure 2A:
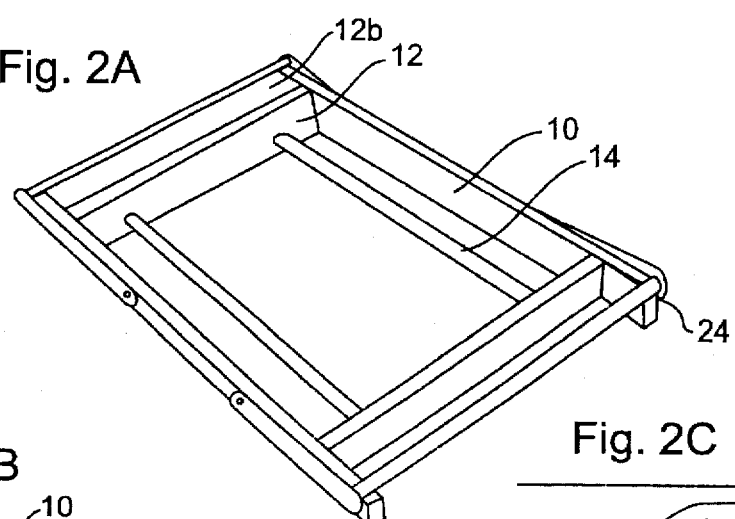
FIG. 2-A shows an alternate embodiment of the carrier with movable handles in the loading position.
Figure 2B:
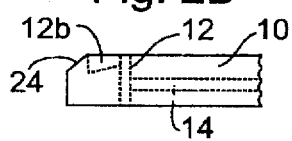
Figure 2C:
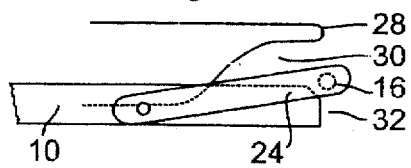

FIGS. 2-A, 2-B, and 2-C show an alternate embodiment of the invention. In FIG. 2-A cross members 12 are upstanding members that extend from the top edge to the bottom edge of base members 10 when connected thereto. Fixed handles 12b are separate components connected to against the upper portion of the outer face of cross members 12 In this embodiment support members 14 are connected to cross members 12 and run parallel to base members 10. See FIG. 2-B. When in the loading position movable handle gripping portions 16 rest on handle rests 24 which are formed by the angled ends of base members 10. Thus positioned they are generally parallel to and generally in the same plane as fixed handles 12b. This allows access space 30 to dish flanges 28 and access space 32 to fixed handles 12b. See FIG. 2-C.

Figure 3A:
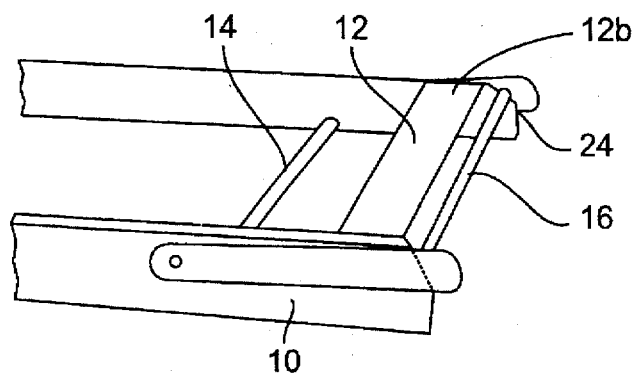
FIG. 3-A shows an additional alternate embodiment of the invention with movable handles in down position.
Figure 3B:
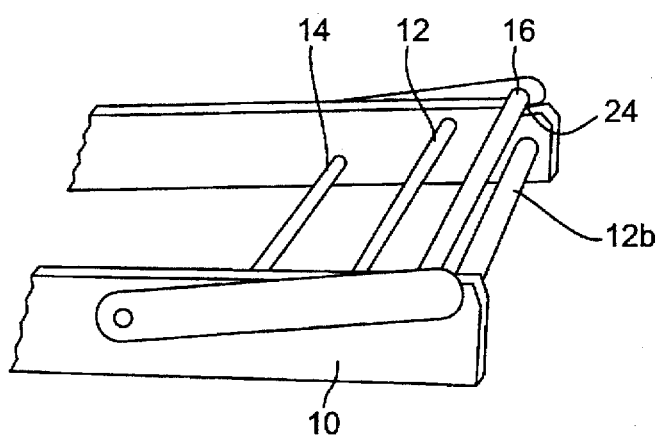

FIGS. 3-A and 3-B show additional alternate embodiments of the invention. In FIG. 3-A cross members 12 are connected to inside faces of base members 10 rather than being attached to the top edge of base members 10 as in the preferred embodiment. In the loading position movable handles 16 rest on handle rest 24 which are formed by the angled ends of base members 10. Thus positioned it is generally parallel to and generally in the same plane as fixed handle 12b. This allows access for the user's fingers to dish flange 28 and to fixed handle 12b.

In FIG. 3-B the-fixed handles 12b are separate components and spaced apart from cross members 12. Cross members 12 serve to secure the dish from movement within the carrier. Fixed handles 12b serve for lifting the carrier. Movable handle gripping portions 16 in the loading position rest on handle rests 24. Handle rests 24 are notches in base members 10 being of sufficient depth to permit fixed handles 16 when resting thereon to be generally parallel to and generally in the same plane as fixed handles 12b. This allows finger access both to dish flange 28 above and to the fixed handle 12b below.

Figure 4A:
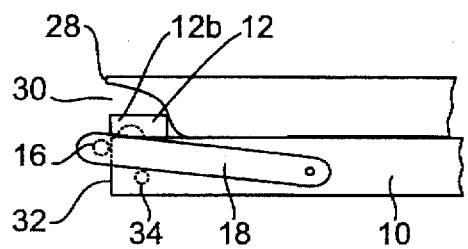
FIG. 4-A shows a cross sectional side view of an alternate embodiment of the handle rests with movable handles in the down position.
Figure 4B:
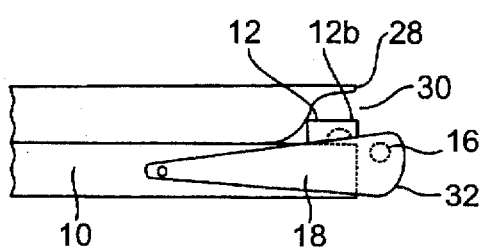

FIGS. 4-A and 4-B show alternate embodiments for causing movable handles 16 in the loading position to rest generally parallel to fixed handles 12b, and generally on the same plane as fixed handles 12b. This provides finger access space 30 to dish flange 28, and access space 32 to fixed handle 12b. In FIG. 4-A a handle stop 34 is provided on the outer face of base members 10. Arms 18 rest on handle stop 34 causing movable handle-gripping portion 16 to remain in the desired position. In FIG. 4-B arms.18 are made wider at the ends to which the movable handle gripping portions 16 are attached. Movable handle gripping portions 16 are attached near the top of wide arm 18. In the loading position the bottom edge of wide arms 18 rest on the table or counter top causing movable handle gripping portion 16 to remain in the desired position to provide access space 30 to dish flanges 28, and access space 32 to fixed handles 12b.

It will be evident from the above description that the carrier of the present invention is easy to manufacture and simple to use. Moreover, it enables the user to move and carry a hot baking dish with relative safety, and it protects the table from the heat of a hot dish.

I claim:

1. A carrier for transport of articles comprising:
   (a) a pair of upstanding base members each said base member having an inner and an outer face, and an end one and an end two, and a top edge and a bottom edge,
   (b) a pair of cross members each said cross member having an inner and an outer face, said cross members being parallel to one another and connected to the top edge of end one and end two of said upstanding base members so that said base members define a plane and are spaced apart parallel to one another and perpendicular to said parallel cross members thus defining a generally square or rectangular interior space, each said cross member being grooved on the under surface thereof thus providing a finger grip and defining said outer face of said cross member as a fixed handle lifting means whereby said carrier can be lifted, held and moved with two hands,
   (c) a pair of front and rear movable handles each said movable handle having a gripping portion and a pair of arms in connection to said gripping portion each said arm in pivotal connection to said outer face of said base member so that said movable handle can be positioned upward in a carrying position and downward in a loading position, there being handle resting means whereby said movable handle gripping portions when in the lowered position are caused to rest in a place generally parallel to and generally in the same plane as said fixed handle lifting means so that finger access space is maintained above said movable handle gripping portions and below said movable handle gripping portions whereby the user's fingers can access the above lifting flanges of a dish sitting in said carrier and the under surface of said fixed handle lifting means below.

2. The carrier of claim 1 further including one or more support means traversing said generally square or rectangular interior space, said support means providing a surface upon which a dish can rest during transport, said support means being comprised of longitudinal, cylindrical members mated to matching holes in inner face of said base members.

3. The carrier of claim 1 wherein said handle resting means is comprised of end portions of said base members extending beyond said cross members whereon said movable handle gripping portions will rest when in the down position.

4. The carrier of claim 1 wherein said movable handle resting means are comprised of arm stops attached to said outer face of said base members whereon said movable handle arms will rest when said movable handles are in the down position thus causing said movable handle gripping portions to be positioned generally parallel to and generally in the same plane as said fixed handle lifting means.

5. The carrier of claim 1 wherein said movable handle resting means are comprised of widened portions of said movable handle arms, said widened portions of movable handle arms when in the down position will rest on the surface holding said carrier thereby causing said movable handle gripping portions to be positioned generally parallel to and generally in the same plane as said fixed handle lifting means.

6. A carrier for transport of articles comprising:
   (a) a pair of upstanding base members each said base member having an inner and an outer face, an end one and an end two,
   (b) a pair of upstanding cross members each said cross member having and an inner and an outer face, said cross members being parallel to one another and connected to the inner face of end one and end two of said upstanding base member so that said base members define a plane and are spaced apart parallel to one another and perpendicular to said parallel upstanding cross members thus defining a generally square or rectangular interior space,
   (c) a pair of fixed handle lifting means comprising a pair of longitudinal members each said longitudinal member having a predetermined size and shape and attached to the upper portion of said outer face of said upstanding cross members,
   (d) a pair of front and rear movable handles each said movable handle having a gripping portion and a pair of arms in connection to said gripping portion each said arm in pivotal connection to said outer face of said base member so that said movable handle can be positioned upward in a carrying position and downward in a loading position, there being handle resting means whereby said movable handle gripping portions when in the lowered position are caused to rest in a place generally parallel to and generally in the same plane as said fixed handle lifting means so that finger access space is maintained above said movable handle gripping portion and below said movable handle gripping portion whereby the user's fingers can access the above lifting flanges of a dish sitting in said carrier and the under surface of said fixed handle lifting means below.

7. The carrier of claim 6 wherein said handle resting means is comprised of end portions of said base members extending beyond said fixed handle resting means, said end portions of said base members being shaped by angling.

8. The carrier of claim 6 further including one or more support means traversing said generally square or rectangular interior space, said support means providing a surface upon which a dish can rest during transport, said support means being comprised of longitudinal, cylindrical members mated to matching holes in said inner face of said upstanding cross members.

9. A carrier for transport of articles comprising:
   (a) a pair of upstanding base members each said base member having an inner and an outer face, and an end one and an end two,
   (b) a pair of longitudinal cross members each said longitudinal cross member having predetermined size and shape with an end one and end two attached to said base members so that said base members define a plane and are spaced apart parallel to one another and perpendicular to said longitudinal cross members thus defining a generally square or rectangular interior space,
   (c) a pair of fixed handle lifting means whereby said carrier may be lifted, held and moved with two hands, said fixed handle lifting means comprising longitudinal fixed handle members each said longitudinal fixed handle member having predetermined size and shape with an end one and end two attached to end one and end two of said base members parallel to and spaced apart from said longitudinal cross members, (d) a pair of front and rear movable handles each said movable handle having a gripping portion and a pair of arms in connection to said gripping portion each said arm in pivotal connection to said outer face of said base member so that said movable handles can be positioned upward in a carrying position and downward in a loading position, there being handle resting means whereby said movable handle gripping portions when in the lowered position are caused to rest in a place generally parallel to and generally in the same plane as said fixed handle lifting means so that finger access space is maintained above said movable handle gripping portion and below said movable handle gripping portion whereby the user's fingers can access he above lifting flange of a dish sitting in said carrier and the under surface of said fixed handle lifting means below.

10. The carrier of claim 9 wherein said movable handle resting means comprises notched portions of upper edges of said base members whereon said movable handle gripping portions will rest when in the down position.

* * * * *